UNITED STATES PATENT OFFICE.

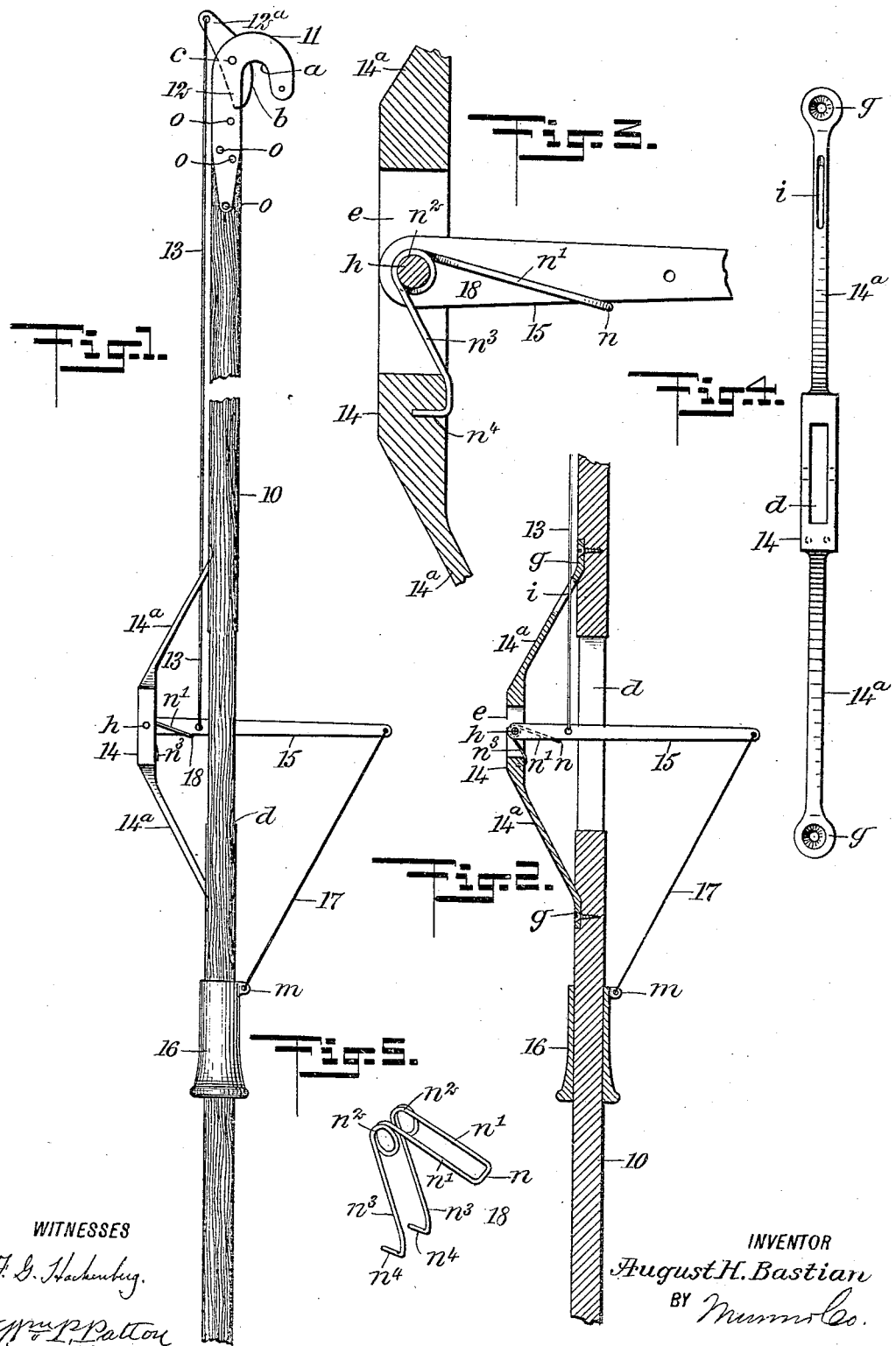

AUGUST H. BASTIAN, OF SELLWOOD, OREGON.

PRUNING IMPLEMENT.

945,677.      Specification of Letters Patent.      Patented Jan. 4, 1910.

Application filed February 17, 1909. Serial No. 478,399.

*To all whom it may concern:*

Be it known that I, AUGUST H. BASTIAN, a citizen of the United States, and a resident of Sellwood, in the county of Multnomah and State of Oregon, have invented a new and Improved Pruning Implement, of which the following is a full, clear, and exact description.

The purpose of the invention is to provide novel details of construction for a pruning implement, that afford an extremely simple, durable and inexpensive tool of the character indicated, that is very convenient and effective in service.

The invention consists in the novel construction and combination of parts, as is hereinafter described and defined in the appended claim.

Reference is to be had to the accompanying drawings forming a part of this specification, in which similar characters of reference indicate corresponding parts in all the views.

Figure 1 is a broken side view of the improved pruning implement; Fig. 2 is a sectional side view of parts that transmit motion to the cutter blade of the improvement; Fig. 3 is an enlarged sectional side view of certain details that appear in Figs. 1 and 2; Fig. 4 is an enlarged edge view of a bracket frame that is a detail of the invention; and Fig. 5 is a detached perspective view of a throw-up spring that is another novel feature of the device.

The pole 10, that supports in proper relative positions operative details of the tool, is in the form of a cylindrical, preferably wooden handle bar, having a suitable diameter and length for effective service. Upon the upper end of the pole 10 a hook-shaped blade 11 is secured, preferably by the embedment of a straight member of the blade in a slot formed in the end portion of the pole, and inserting screws or bolts $o$ transversely through the pole and blade, as is indicated in Fig. 1, so that the concave edged portion of the blade overhangs the side of the pole, and is adapted for free engagement with limbs that are to be pruned from trees or the like. A cutter blade 12, having a convex edge $b$ is pivoted upon the side of the hook-shaped blade 11, and its cutting edge disposed so that by a rocking movement said edge will cross the concave edge $a$ of the fixed blade with a shearing action. The rockable blade 12 is formed with a shank $12^a$ which extends away from the pivot $c$ that connects the two blades, and at the outer end said shank is perforated transversely, the perforation receiving a hook or loop formed on the upper end of a pendent connecting rod 13. At a suitable distance from the hook-shaped blade 11 and in the same plane therewith, a longitudinal slot $d$ is formed centrally through the pole 10.

A bracket frame 14, consisting of a metal bar having a thickened central portion wherein a slot $e$ is longitudinally formed is secured to the pole, two similar limbs $14^a$ being extended from the slotted portion and each inclined therefrom, thus adapting the ends of said limbs to have contact with the body of the pole 10, said ends terminating in feet $g$ that are perforated and embedded in said pole whereon they are secured by screws as shown in Fig. 2. In the slot $e$ one end of a lever 15 is pivoted, as shown at $h$, in Figs. 2 and 3, the body of said lever passing through the slot $d$ in the pole 10. In the upper limb $14^a$ of the bracket frame 14 an opening $i$ is formed, through which the lower portion of the connecting rod 13 passes, the depending end of the rod being loosely secured to the lever 15. A runner sleeve 16 is loosely mounted upon the pole 10 below the bracket frame 14. On an ear $m$, that is formed on the upper end of the runner sleeve 16, the lower end of a link rod 17 is loosely connected, said rod having the upper end thereof similarly connected to the extended end of the lever 15.

A throw-up spring 18 is a completing detail of the improvement, and as shown clearly in Figs. 3 and 5, is constructed from a single piece of resilient wire having proper length and suitable tensional strength. A flattened loop $n$ is formed at the center of the wire rod, providing two parallel arms $n'$, that are of an equal length, and terminate in two similar spring coils $n^2$, from which two limbs $n^3$ are extended parallel with each other, said limbs terminating in hooks $n^4$. In application of the throw-up spring 18 for service, the lever 15 is, while detached from the bracket 14, introduced between the spring coils $n^2$, and then replaced in the slot $e$ of the bracket frame. The pivot $h$ is now inserted through the perforated walls of the slotted portion of the bracket frame 14, and through the spring coils and lever 15. The arms $n'$ are thus disposed at the sides of the lever, respectively, and the flattened loop $n$ impinged upon the lower edge of the lever 15. The depending limbs $n^3$, that are located each side of the lever, respectively, are bent toward the pole 10, and the hooks $n^4$ thereon are embedded in two sockets formed in the bracket frame below the slot $e$ therein.

The connection of the throw-up spring 18 with the bracket frame 14 and lever 15, as explained, adapts the arms $n'$ and the connecting loop $n$ to return the lever 15 to a normal horizontal position at right angles with the axis of the pole 10, after it has been rocked downward and the pull on its outer end is relaxed.

It will be seen that the lever 15 in normal position supports the pendent connecting rod 13 in upward adjustment, and that said rod by its upward adjustment rocks the pivoted blade 12 into open adjustment, as shown in Fig. 1.

In use, the operator takes hold of the pole 10 with one hand, and the runner sleeve 16 with the other hand, which will enable him to hook the fixed blade 11 upon a limb or branch of a tree that is to be removed, whereupon a downward sliding movement of the runner sleeve 16 will rock the lever 15 downward and forcibly rock the blade 12, so that its convex cutting edge will impinge upon the limb and sever it from the tree.

It will be noted that upon completion of the cutting of a limb or branch, the simple act of ceasing to pull on the sleeve 16, adapts the throw-up spring 18 to return the lever 15 to a horizontal position and lift the shank of the rockable cutter 12, so as to remove its cutting edge from the concave edge of the fixed cutter 11, thus restoring the blades to normal adjustment for renewed service.

As shown in Fig. 1, the bolts, screws or rivets $o$ which secure the cutter blade 11, or the pole 10, are staggered, so that the perforations in the pole that receive said rivets or screws will not be alined, and splitting of the pole is avoided.

Having thus described my invention, I claim as new and desire to secure by Letters Patent:

A device of the class described comprising a pole having at one end a hook whose inner edge is sharpened for the purpose set forth, a sleeve slidable on the other end of the pole, a bracket comprising a body portion having a transverse slot and arms whose ends are connected with the pole, one of said arms being transversely slotted, a lever pivoted in the slot of the body portion of the bracket and extending through the pole, a connection between the free end of the lever and the sleeve, a movable blade pivoted to the hook and coöperating with the sharpened edge thereof, a connection between said blade and the lever and passing through the opening of the arm, and a spring engaging the lever for normally retaining the movable blade out of contact with the fixed blade.

In testimony whereof I have signed my name to this specification in the presence of two subscribing witnesses.

AUGUST H. BASTIAN.

Witnesses:
PETER HUME,
C. A. HUME.